Dec. 13, 1955   L. NIRENBERG   2,726,734
ACETYLENE PURIFICATION
Filed May 11, 1954
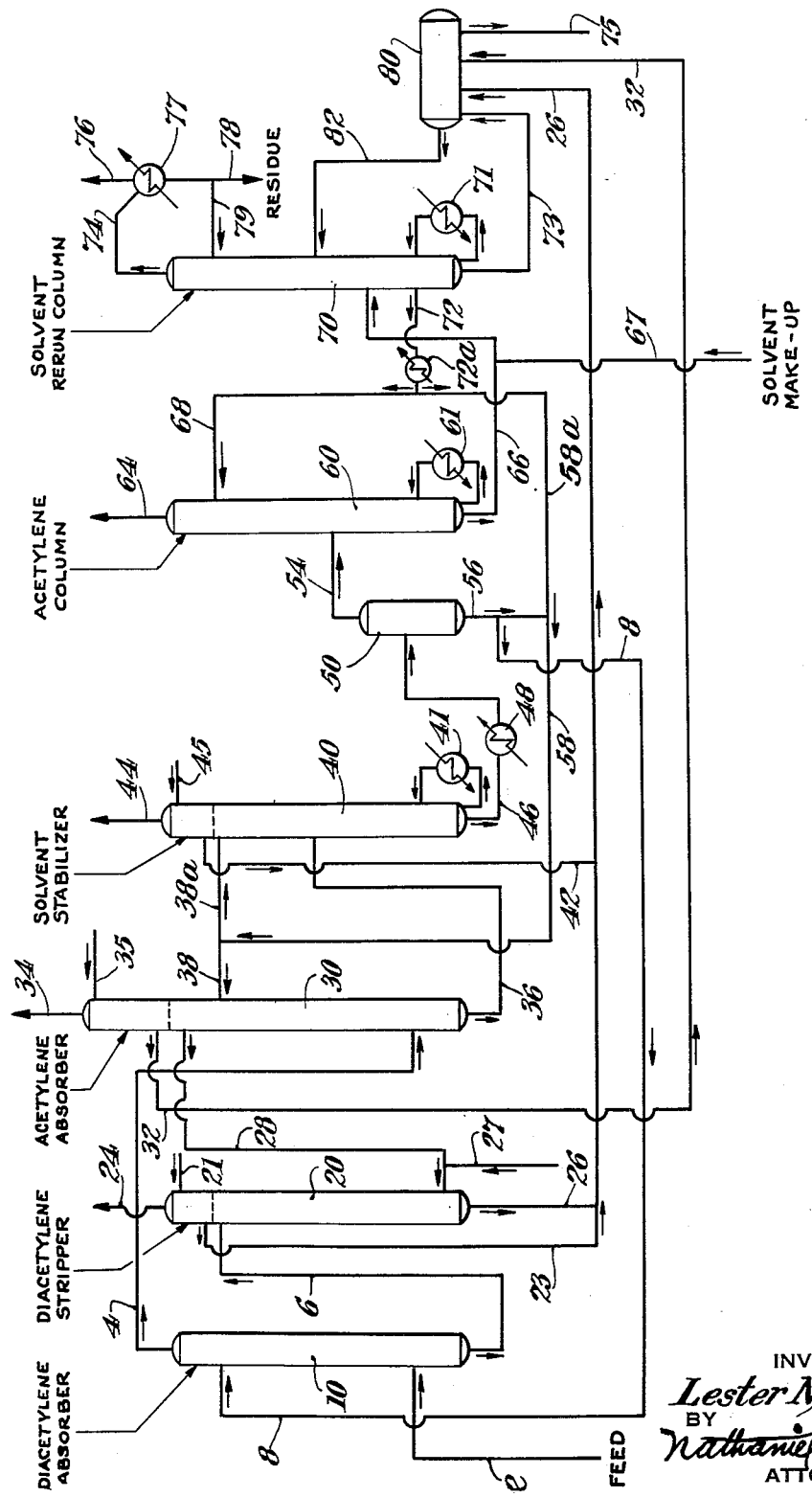
INVENTOR
Lester Nirenberg
BY
Nathaniel Ely
ATTORNEY

United States Patent Office 2,726,734
Patented Dec. 13, 1955

2,726,734

ACETYLENE PURIFICATION

Lester Nirenberg, New York, N. Y., assignor to The Lummus Company, New York, N. Y., a corporation of Delaware Application May 11, 1954, Serial No. 428,984

13 Claims. (Cl. 183—115)

This invention relates to a process for the separation and recovery of acetylene from a gas mixture and more particularly relates to an improved absorption process for the recovery of high purity acetylene.

In recent years a great deal of interest has been shown in the production of acetylene from natural gas or other gaseous hydrocarbons by means of a high temperature cracking process. This cracking process is normally carried out on hydrocarbon gases or mixture of the same in furnaces of unique design generally at temperatures of from 1500–2500° F. The product of such a cracking operation is a mixture of gases which contains, in addition to the desired acetylene, substantial quantities of undesirable components such as methyl acetylene, vinyl acetylene, diacetylene, benzene, naphthalene, tars and heavy oils.

It is of course well known that the acetylene present in such a mixture can be recovered therefrom in a number of ways. One of the more widely used methods for separating the acetylene from other components of the cracked gas mixture is the absorption system. This method utilizes a selective solvent or solvents in which the acetylene and other components of the gas mixture are preferentially dissolved and from which such components are thereafter separated. The separation of the absorbed or dissolved gaseous components from the solvent mixture is generally accomplished by treating the solvent under conditions which cause the more volatile or lower boiling absorbed gases to leave the solvent. Due to their comparatively high cost the solvents used in such systems are normally regenerated or purified after acetylene recovery, to remove the remaining dissolved or absorbed components of the gas mixture. Such regeneration permits the solvent to be used again for further acetylene recovery.

In a conventional acetylene recovery system, the regeneration of solvent is generally accomplished in final stripping, an operation in which by means of heat and/or a stripping gas, dissolved components remaining after acetylene separation are removed from the solvent. The cost of this final stripping operation is an important element in the overall product cost of acetylene and is also an important factor in the initial plant cost since a separate column including associated equipment such as heating and condensing apparatus is required to carry out the final stripping operation.

According to my improved acetylene recovery process, however, I am able to accomplish the desired recovery of an acetylene product of at least 99.5% purity without the necessity of a final stripping operation and with no appreciable increase in duty in the remaining towers or process steps. Further by eliminating final stripping, I am able to increase total acetylene product recovery from 2 to 4% since the normal loss of acetylene product in off gas from the stripping operation is eliminated. No added utility expense is required for the operation of the remaining towers utilized in carrying out my process, nor is there an appreciable decrease in the effective absorption quality of the solvent.

These and other advantages are accomplished according to my invention which in its broader aspect is based on the unique distribution of the solvent used and the controlled delivery of predetermined amounts of solvent to the various separation operations carried out in the recovery system. It has been found that if after flashing off acetylene from the main solvent stream, prior to final acetylene recovery, the liquid solvent bottoms remaining after the flash operation is divided into two portions, one of which is used to carry out initial diacetylene scrubbing and the other for main absorption duty and stabilization, no final stripping of the main solvent stream is required. This is due to the fact that the amount of solvent necessary to accomplish diacetylene removal is substantially that quantity of solvent normally used in solvent rerun to maintain solvent purity. The solvent obtained from the rerun operation is substantially pure and is stabilized to effect the final acetylene recovery as well as maintain overall solvent purity at the required effective level.

More specifically my process includes initially contacting an acetylene containing cracked gas with a first portion of selective solvent, withdrawing an acetylene containing overhead from the initial contact and further contacting the overhead with a second portion of solvent. The bottoms obtained in the initial contact after removal of diacetylene are passed to rerun to provide sufficient pure solvent to effect final acetylene recovery and to maintain solvent purity level. After the acetylene is absorbed in the second portion of solvent, this stream is stabilized, partially vaporized and introduced to a gas liquid separator, wherein the acetylene is flashed from the solvent, withdrawn from the separator and passed to final recovery. Final acetylene recovery is accomplished in part by the addition of a portion of the pure solvent obtained in solvent rerun.

The liquid bottoms remaining after the gas liquid separation constitutes the main solvent stream and is used directly to accomplish the initial contact or scrubbing of diacetylene, the main absorption of the overhead obtained from the initial contact as well as stabilization of the acetylene rich solvent resulting from the contact of the overhead stream and the second solvent operation. Purity of this main solvent stream is maintained by the addition thereto of the portion of pure solvent remaining from the rerun operation.

The accompanying drawing is a flow sheet diagrammatically illustrating one embodiment of my invention. The description following generally refers to the selective solvent used as dimethyl formamide since I have found this solvent to be particularly effective in acetylene recovery. It is to be understood that other selective solvents or combinations of the same would serve equally as well.

In a conventional acetylene recovery system the product of the high temperature cracking operation is a gaseous mixture, which contains in varying amounts the desired acetylene as well as other components such as those appearing in Table I. On withdrawal from the cracking furnace the gas mixture is generally passed through several preliminary treating steps to remove such undesirable components as carbon tars, heavier aromatics and oils prior to separating the closely boiling components of the mixture. After preliminary treatment the cracked gas mixture is compressed and passed to the recovery system. These preliminary steps are not further described since they do not constitute a part of this invention.

The amount of acetylene present in the cracked gas mixture will vary, depending on the nature of the feed and the conditions at which the cracking is carried out.

Table I below is an analysis of typical cracked gas compositions obtainable in the high temperature cracking of various hydrocarbon feeds such as those indicated. Cracking of the feed gases in Table I was carried out under substantially the same conditions for all feeds and at a temperature of approximately 2200° F.

*Table I*

[Mol percent]

| Composition | (a) Natural Gas | (b) Ethane | (c) Propane |
|---|---|---|---|
| Hydrogen | 49.1 | 56.4 | 55.0 |
| Nitrogen | 4.1 | 4.6 | 1.5 |
| Oxygen | | | |
| Carbon Monoxide | 8.0 | 8.4 | 5.7 |
| Carbon Dioxide | 1.4 | 3.1 | 1.8 |
| Methane | 28.1 | 8.6 | 16.6 |
| Ethane | 0.1 | 0.2 | |
| Ethylene | 1.0 | 2.9 | 6.0 |
| Acetylene | 7.0 | 15.0 | 12.5 |
| Propane | 0.1 | 0.1 | 0.1 |
| Propylene | 0.1 | 0.1 | 0.1 |
| Methyl Acetylene | 0.3 | 0.2 | 0.2 |
| Butane | 0.4 | | |
| Higher Acetylenes (Diacetylene Vinyl Acetylene) | 0.3 | 0.4 | 0.5 |
| Total | 100.0 | 100.0 | 100.0 |

Referring now to the drawing, a gas mixture having a composition similar to one of the cracked gas compositions in Table I above, is compressed and introduced into primary column 10 or the diacetylene absorber, as hereinafter referred to, by line 2. Column 10 is a conventional absorption column provided with a plurality of decks, trays, baffles, packing or other means to insure complete contact between the gases and solvent, and is normally operated at a pressure above 100 p. s. i. g. and at a temperature generally below 100° F. Selective solvent is introduced into the upper portion of column 10 as at 8, under conditions and in an amount sufficient to dissolve or absorb substantially all of the diacetylene and higher boiling components present in the cracked gas. The undissolved gaseous components of the mixture, those generally lighter than the diacetylene, are withdrawn as an overhead from column 10 by way of line 4 and introduced into the lower part of the main acetylene absorber 30. This overhead constitutes the main product stream from which the acetylene will thereafter be separated.

The solvent bottoms, containing a major portion of the diacetylene initially present in the gaseous mixture, is withdrawn from column 10 in line 6 and passed to the diacetylene stripper 20. Included in this stream will be a small amount of acetylene as well as small amounts of other lighter components such as hydrogen, ethane and ethylene, which are dissolved in the solvent during initial contact in column 10. The absorption of the small amount of acetylene in the solvent bottoms withdrawn at 6 constitutes a small loss in overall acetylene recovery on a once through basis. However, a substantial portion of this is recovered by recycling stripper overhead to the cracking furnaces by way of line 24.

Stripper 20 is operated at approximately atmospheric pressure and is provided with a stream of stripping gas introduced into the lower portion thereof by way of line 28 or alternatively line 27. If desired, stripping can be accomplished by utilizing a portion of the initial gaseous hydrocarbon feed in line 27 prior to passing the feed to the cracking furnace. Alternatively, stripping is accomplished by introducing the off gas from main acetylene absorber 30 by line 28 into the lower part of column 20. The stripped gas overhead withdrawn in line 24 after stripping contains upwards of 60% of the diacetylene initially present in the gaseous mixture.

Water scrubbing is provided in the top of column 20, to absorb any partially vaporized solvent which would normally be carried off with gaseous overhead. Since some vaporization of solvent occurs in towers 30 and 40 as well, water scrubbing is also provided in these towers. Total condensed solvent and scrub water is collected in lines 23, 26, 32 and 42 respectively, led to rerun column 70 wherein water and solvent are separated. Condensed solvent recovered in water scrubbing may amount to from 0.10% to 0.5% of the total solvent quantity present in the system and its recovery by water scrubbing provides some economy in reducing solvent loss.

The overhead product from the primary or diacetylene absorber 10, on introduction into the main absorber 30, is contacted with a stream of solvent delivered thereto by way of lines 38 and 58 respectively. Column 30, similar to column 10, is provided with contact means for establishing maximum contact between the gaseous mixture and solvent so that the acetylene and heavier components of the mixture will be dissolved therein. Column 30 is operated at a pressure of between 100 p. s. i. g. and 200 p. s. i. g. and accomplishes the main separation between acetylene and lower boiling compounds.

The undissolved gases which comprise essentially methane and hydrogen are withdrawn as overhead in line 34 and pass to storage facilities and/or to the cracking furnaces for utilization therein as fuel. A water scrubber is provided at 35 to recover the small quantity of vaporized solvent present in the off gas.

The bottoms product of the main absorption conducted in absorber 30 contains substantially all the acetylene as well as the higher boiling acetylene compounds such as methyl acetylene and vinyl acetylene. In addition, a small percentage of absorbed lighter gases may be included therewith which are removed in stabilizer 40.

The bottoms withdrawn from column 30 in line 36 are led to a solvent stabilizer 40 normally operated at from about 10 to approximately 20 p. s. i. g. and at approximately 80–100° F. A stream of solvent is provided by line 38a from a solvent source hereafter described. Heat is supplied to column 40 by reboiler circuit 41 so that the absorbed lighter gases, such as a small percentage of methane, hydrogen and carbon dioxide, will be removed as an overhead product in line 44. In addition to the removal of carbon dioxide, a small percentage of acetylene may also be carried overhead in this stabilizing operation. However, this acetylene present in the overhead product is not lost since the overhead stream is generally recycled and combined with the net feed stream prior to compression. This recycle provides an overall purification equilibrium in the system so that net low boiling compound feed to the recovery system will be removed as overhead from the main absorber 30.

The stabilized solvent which includes substantially all of the acetylene now free of lighter components, is withdrawn from the stabilizer 40 in line 46, passed through heater 48 and introduced into the gas liquid separator or flash drum 50. Heater 48 is maintained at a temperature sufficient to cause at least a partial vaporization of the solvent stream and is generally operated at a temperature of from 150 to 300° F. On introduction of the rich solvent stream to tank 50 the acetylenes flash off and are withdrawn in line 54.

As shown in the drawing, heat is provided by heat exchanger 48, though any other suitable or convenient means of supplying heat, such as a heating coil, may be used. The acetylenes are then passed to final acetylene purification conducted in acetylene column 60. Included in the flashed gases may be a small portion of vaporized solvent which will be recovered in the acetylene tower bottoms in line 66.

The liquid product remaining after the flash operation in gas-liquid separator 50 is withdrawn in line 56. Part of this stream, which is now substantially free of acetylene compounds is passed to the diacetylene absorber through line 8. It is this minor portion of solvent, generally amounting to not more than 2% of the total solvent liquid withdrawn from drum 50, which accomplishes the initial scrubbing and separation of diacetylene from other acetylenes. More importantly, it is substantially this amount which as a stripped bottoms from the diacetylene stripper, on passage to solvent rerun, will maintain solvent purity at a level sufficient to accomplish the acetylene absorption load without further stripping.

Since according to my invention absorption can be accomplished by the solvent remaining after flash without appreciable product loss due to ineffective solvent action, I am able to eliminate final stripping. In so doing an increase in total acetylene product yield of from 2–4% is gained, since this amount, normally remaining in the solvent before stripping, would be lost in the off gas of the stripping operation. However, due to my recycling of the solvent stream after flash to absorption duty in columns 10, 30 and 40, the acetylene present in this solvent is returned to the system where it will be partially recovered as normal product in final acetylene recovery.

A second or major portion of the solvent withdrawn in line 56 is passed to the main absorber 30 and solvent stabilizer 40 by lines 58, 38 and 38a respectively. This stream of solvent is supplemented by purified solvent withdrawn from the rerun column 70 by lines 72 and 58a respectively.

As described in the copending application of M. J. P. Bogart, Serial No. 428,489 filed May 10, 1954, it is the separation of the methyl acetylene and acetylene which is the most difficult to efficiently carry out in a system of this type. This is due to close proximity of molecular weight and boiling points of those two compounds.

The flashed gases introduced into fractionator absorber 60 are contacted with a stream of very pure solvent introduced by line 68. This solvent stream is cooled as by cooler 72a to a temperature below 20° F. since the absorptive power of the solvent is generally greater at lower temperatures. The low temperature at which the solvent is introduced into column 60 obviates the need for water scrubbing of vaporized solvent as is provided in the upper parts of columns 20, 30 and 40. Alternatively if a cool stream of solvent is not provided it may be necessary to use water scrubbing to prevent carry over of vaporized solvent in the overhead stream.

Pure solvent is obtained from the solvent rerun column 70 which is operated on the diacetylene stripper bottoms, the acetylene column bottoms, and the small amount of solvent recovered by water scrubbing. It is the unique gas-liquid separation accomplished in flash tank 50 prior to final acetylene recovery that makes possible the final separation of acetylene from its closely boiling component methyl acetylene while utilizing only a minimum amount of additional pure solvent.

Reboiler circuit 61 in the lower part of column 60 provides the heat necessary to effect the separation of acetylene from the solvent and remaining acetylenes. The acetylene is withdrawn as overhead in line 64 and passed to storage facilities, not shown. The acetylene obtained by this recovery system has a purity of 99.5% or better. The small percentage of impurities remaining may include some or all of the following compounds: ethylene, methyl acetylene and carbon dioxide. Those compounds cannot be effectively removed within the present economic limitations of the process.

After separation of the acetylene is accomplished in column 60 the solvent is withdrawn as bottoms in line 66 and introduced into solvent rerun column 70, a conventional fractionating column generally operated under atmospheric conditions. The addition of heat to column 70 by reboiler circuit 71 causes release of the remaining gaseous acetylene and other non-condensible gases which are then withdrawn from column 70 as overhead by line 74, and passed through condenser 77. Non-condensible gases are withdrawn at 76 with condensed products passing to residue in 78, and tower reflux at 79.

Solvent purified in column 70 is withdrawn in line 72 as vapor, is then condensed and passed in part to the upper part of acetylene column 60 by line 68. This quantity of solvent is about 50% of the total rerun solvent product. The remaining portion of purified solvent is introduced into the main solvent stream 58 to maintain solvent purity level. Solvent makeup is provided at 67.

An example of my process follows:

668 lb./hr. cracked gas (containing 15 mol per cent acetylene) compressed to 150 p. s. i. g., is introduced to a diacetylene absorber and contacted with dimethyl formamide introduced to the absorber at the rate of 127 lb./hr. The acetylene containing overhead is withdrawn from the diacetylene absorber at the rate 652 lb./hr. and led to an acetylene absorber supplied with 4,689 lbs./hr. of dimethyl formamide. Diacetylene absorber bottoms are stripped in a diacetylene stripper and provide a bottoms stream of 144 lb./hr. which is led to a solvent rerun still. This amount maintains solvent purity at sufficient level to operate the acetylene absorber and solvent stabilizer with negligible product loss and without requiring total solvent stripping. The bottoms from the acetylene absorber amounting to 4,910 lb./hr. are stabilized. Dimethyl formamide is added at the rate of 2240 lb./hr. during stabilization. The product of stabilization is heated to a temperature of 2,570° F. and introduced to a gas-liquid separator. Flashed gases resulting from the gas-liquid separation are withdrawn at the rate of 650 lb./hr. Solvent remaining after flash amounted to 6,429 lb./hr.

During separation of the flashed gases 710 lb./hr. of pure solvent is added to the acetylene column to provide 128 lb./hr. of acetylene having a purity of 99.5%.

As previously described my improved process is based on the unique use of particular quantities of solvent delivered to specific separation operations.

Under the conditions prevailing in tank 50 a liquid solvent stream is obtained substantially free of acetylenes. This purity solvent stream has been found to be sufficiently effective to provide absorption in columns 10, 30 and 40 respectively, without excessive loss of acetylene product. It is of course well known that continuous circulation of such a solvent solution without providing means for maintaining a level of purity, results in a solvent of reduced absorptive effectiveness which eventually causes loss of acetylene recovery and contaminates the acetylene product.

If desired a decanter 80 may be provided in the clean up or solvent rerun systems to provide separation and withdrawal of tars and water from the solvent prior to rerun in which case the condensed solvent and scrub water are admitted to such decanter through lines 26 and 32. Rerun column bottoms enter the decanter 80 through line 73 with the high boiling impurities withdrawn through line 75. The solvent thereafter passes through line 82 to rerun column 70.

The amount of solvent passed to such clean-up may of course be varied and is generally balanced between required solvent purity standards and the economic operation of the clean-up tower. As described above I have found dimethyl formamide ideally suited for the purposes of my invention. However, other selective solvents such as butyrolactone, cellosolve acetate, diethylamine, diethyloxalate, ethylene diacetate, monoethanolamine as well as others can be used.

As previously described, one of the essential features of this invention is to provide this required solvent purity with a reduction in the equipment normally required and further, to obtain overall increase in total product quantity. I am able to accomplish this by dividing the liquid stream obtained after removal of acetylene in the gas liquid separator into major and minor portions and utilized as described above. I have found that the amount of solvent which must be continually delivered to clean-up or rerun is substantially that amount required to scrub out most of the diacetylene initially present in the cracked gas. This amount is normally about 2.0 per cent of the total amount of liquid solvent remaining after the flashing-off of acetylenes in 50, when the solvent used is dimethyl formamide.

According to my invention I have accomplished removal of diacetylene and maintain solvent purity at the required level for effectively absorbing acetylene, without stripping the total solvent and without excessive loss of acetylene product. My division or separation of the liquid solvent product after flashing as carried out in tank 50, plus the recycled pure solvent in 58a provides a main solvent stream of sufficient quality and quantity to accomplish absorption in columns 30 and 40 with no excessive loss of acetylene product. Since no stripping of solvent is necessary according to my advantageous use of the liquid solvent stream after flashing, I recover most of that quantity of acetylene normally carried overhead with the stripping gas in the solvent stripping operation as carried out in conventional recovery systems. While this amount of acetylene is comparatively small, its recovery as product in line 64 amounts to an increase of from 2 to 4% in total acetylene product. In addition to the increase in recovered acetylene, initial plant costs are considerably reduced since the final stripping tower and associated equipment are not required. The elimination of this tower amounts to a saving of approximately 5–10% in overall plant cost.

It is apparent that many modifications of this invention may be made without departing from the spirit and scope thereof and therefore it is intended that my process should not be limited in any manner except as in the appended claims.

I claim:

1. In a process for recovering acetylene from a cracked gas mixture which includes diacetylene, vinyl acetylene, methane, hydrogen and other components, the steps comprising initially contacting the cracked gas with a first portion of selective solvent to obtain a solvent stream rich in diacetylene and heavier components, and an acetylene containing overhead substantially free of diacetylene, stripping diacetylene from the solvent stream and passing the stripped solvent to a solvent rerun system, contacting the acetylene containing overhead with a second portion of solvent to obtain substantially complete absorption of the acetylenes by said second portion of solvent, heating the acetylene rich solvent to flash off said acetylenes, passing the flashed acetylenes to an acetylene recovery column, contacting said acetylenes in the acetylene recovery column with substantially pure solvent obtained from the rerun system to provide an overhead product comprising substantially pure acetylene and proportioning the solvent remaining after the flashing of acetylenes into the first and second solvent portions utilized in the absorption of diacetylene and the absorption of acetylene.

2. In a process for recovering acetylene from a cracked gas mixture which includes diacetylene, vinyl acetylene, methane, hydrogen and other components as claimed in claim 1 wherein the first selective solvent portion is a minor portion, and the second solvent portion is a major portion of the selective solvent used.

3. In a process for recovering acetylene from a cracked gas mixture which includes diacetylene, vinyl acetylene, methane, hydrogen and other components as claimed in claim 1 wherein the bottoms from the acetylene recovery column are passed to a solvent rerun system.

4. A process for recovering acetylene from a gaseous mixture obtained from the high temperature cracking of a gaseous hydrocarbon which comprises initially contacting the gaseous mixture with a minor portion of a selective solvent to obtain a solvent stream rich in diacetylene and heavier components, and an acetylene containing overhead substantially free of diacetylene, stripping diacetylene from the solvent stream and passing the stripped solvent to a solvent rerun system, contacting the acetylene containing overhead with a major portion of solvent to obtain substantially complete absorption of all the acetylenes by said major portion of solvent, stabilizing the acetylene rich solvent stream and thereby removing gases lighter than acetylene from the solvent stream, heating the acetylene rich solvent to flash off said acetylenes, passing the flashed acetylenes to an acetylene recovery column, dividing the solvent remaining after the flashing off of the acetylenes into the respective major and minor solvent portions, contacting the flashed acetylene in an acetylene recovery column with substantially pure solvent obtained from the rerun system, withdrawing an overhead product from the acetylene column comprising substantially pure acetylene, and passing the bottoms from said acetylene column to the solvent rerun system.

5. A process for recovering acetylene from a gaseous mixture obtained from the high temperature cracking of a gaseous hydrocarbon as claimed in claim 4 wherein the minor solvent portion is approximately 2% of the total solvent utilized.

6. A process for recovering acetylene from a gaseous mixture obtained from the high temperature cracking of a gaseous hydrocarbon as claimed in claim 4 wherein the selective solvent used is dimethyl formamide.

7. A process for recovering acetylene from a gaseous mixture obtained from the high temperature cracking of a gaseous hydrocarbon, which mixture includes diacetylene, vinyl acetylene, methane, hydrogen and other components comprising introducing the gaseous mixture to a diacetylene absorber and contacting the same therein with a first portion of low purity solvent to absorb most of the diacetylene and all of the heavier components present in said mixture, and provide a gaseous overhead substantially free of diacetylene, withdrawing a liquid bottoms from the diacetylene absorber comprising solvent, diacetylene and heavier components, and introducing the same to a diacetylene stripping column, introducing a stripping gas into said column and withdrawing an overhead of diacetylene and stripping gas, withdrawing a liquid solvent bottoms from said stripper free of diacetylene and passing said bottoms to a solvent rerun column, introducing the gaseous overhead from the diacetylene absorber to an acetylene absorber and contacting the same therein with a second portion of low purity solvent to absorb substantially all the acetylenes and components of the mixture boiling above acetylene, withdrawing an overhead product from the acetylene absorber, comprising gases lighter than acetylene, passing the acetylene absorber bottoms to a stabilizing column provided with a third portion of low purity solvent, withdrawing a stabilized bottoms stream from said stabilizer, heating said stream to a temperature so as to flash-off acetylenic components present in said bottoms stream, separating flashed gases and solvent and introducing the flashed gases to an acetylene recovery column, contacting the flashed gases in said recovery column with a portion of high purity solvent obtained from the solvent rerun column and withdrawing an overhead of substantially pure acetylene from said recovery column, withdrawing the solvent remaining after flashing of the acetylenes and dividing said solvent into the respective first, second and third low purity solvent portions, withdrawing a bottoms product from the acetylene recovery column, passing said bottoms to the solvent rerun column, and withdrawing solvent from said rerun having a purity higher than the solvent obtained after flashing of the acetylenes.

8. A process for recovering acetylene from a gaseous mixture obtained from the high temperature cracking of a gaseous hydrocarbon, which mixture includes diacetylene, vinylacetylene, methane, hydrogen and other components as claimed in claim 7 wherein the overhead withdrawn from the diacetylene stripper is recycled to the cracking operation.

9. A process for recovering acetylene from a gaseous mixture obtained from the high temperature cracking of a gaseous hydrocarbon, which mixture includes diacetylene, vinyl acetylene, methane, hydrogen and other components as claimed in claim 7 wherein the stripping gas comprises the gaseous hydrocarbon feed.

10. A process for recovering acetylene from a gaseous mixture obtained from the high temperature cracking of a gaseous hydrocarbon, which mixture includes diacetylene, vinyl acetylene, methane, hydrogen and other components as claimed in claim 7 wherein the stripping gas comprises acetylene absorber overhead and gaseous hydrocarbon feed.

11. A process for recovering acetylene from a gaseous mixture obtained from the high temperature cracking of a gaseous hydrocarbon, which mixture includes diacetylene, vinyl acetylene, methane, hydrogen and other components as claimed in claim 7 wherein the amount of solvent used in the absorption of diacetylene and heavier components of the gaseous mixture is that quantity required in solvent rerun to maintain solvent purity in the system below the maximum contamination level.

12. A process for recovering acetylene from a gaseous mixture obtained from the high temperature cracking of a gaseous hydrocarbon, which mixture includes diacetylene, vinyl acetylene, methane, hydrogen and other components as claimed in claim 7 wherein the high purity solvent withdrawn from the solvent rerun column is divided to provide the high solvent purity portion utilized in the final acetylene recovery column, and the remaining portion is added to the low purity solvent obtained after flashing of the acetylenic compounds.

13. A process for recovering acetylene from a gaseous mixture obtained from the high temperature cracking of a gaseous hydrocarbon, which mixture includes diacetylene, vinyl acetylene, methane, hydrogen and other components as claimed in claim 7 wherein the first solvent portion is a minor portion of the total low purity solvent, and the second and third solvent portions are the major portions of the total low purity solvent.

References Cited in the file of this patent

UNITED STATES PATENTS

| | | |
|---|---|---|
| 1,989,273 | Grimme et al. | Jan. 29, 1935 |
| 2,146,448 | Scott et al. | Feb. 7, 1939 |
| 2,405,693 | Hamill et al. | Aug. 13, 1946 |

OTHER REFERENCES

Publication, "The Wulff Process for Acetylene From Hydrocarbons," Petroleum Processing, vol. 8, March 1953, pages 377–383.